(12) United States Patent
Foussianes et al.

(10) Patent No.: US 8,002,325 B2
(45) Date of Patent: Aug. 23, 2011

(54) STOWABLE CHILD SEAT FOR AUTOMOTIVE VEHICLES

(75) Inventors: Dean Basil Foussianes, Birmingham, MI (US); Kip Alan Ewing, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 2 days.

(21) Appl. No.: 12/690,401

(22) Filed: Jan. 20, 2010

(65) Prior Publication Data

US 2010/0117417 A1    May 13, 2010

Related U.S. Application Data

(62) Division of application No. 11/844,655, filed on Aug. 24, 2007, now Pat. No. 7,658,431.

(51) Int. Cl.
*B60N 2/02* (2006.01)
(52) U.S. Cl. .................................................. 296/68.1
(58) Field of Classification Search ............ 296/68.1, 296/65.01, 65.09; 297/256.13, 488, 238, 297/485, 254, 250, 117
See application file for complete search history.

(56) References Cited

U.S. PATENT DOCUMENTS

| | | | | |
|---|---|---|---|---|
| 2,584,481 | A * | 2/1952 | Mast et al. | 297/115 |
| 3,094,354 | A * | 6/1963 | Bernier | 297/112 |
| 3,404,917 | A * | 10/1968 | Smith | 297/256.1 |
| 4,555,135 | A | 11/1985 | Freeland | |
| 4,690,449 | A | 9/1987 | Holman | |
| 4,756,573 | A * | 7/1988 | Simin et al. | 297/250.1 |
| 4,768,827 | A | 9/1988 | Musgrove | |
| 4,781,412 | A | 11/1988 | Holman | |
| 4,869,541 | A * | 9/1989 | Wainwright | 296/65.09 |
| 4,902,070 | A | 2/1990 | Casale et al. | |
| 4,932,706 | A * | 6/1990 | Wainwright et al. | 296/65.09 |
| 4,932,709 | A * | 6/1990 | Wainwright | 296/65.09 |
| 4,936,627 | A | 6/1990 | Guim | |
| 5,044,683 | A * | 9/1991 | Parsson | 296/65.09 |

(Continued)

FOREIGN PATENT DOCUMENTS

DE    19646621 C1    11/1997

(Continued)

OTHER PUBLICATIONS

Extended European Search Report for corresponding Application No. 08162330.8, mailed Jun. 23, 2010, 6 pages.

*Primary Examiner* — Kiran B. Patel
(74) *Attorney, Agent, or Firm* — Gregory Brown; Brooks Kushman P.C.

(57) ABSTRACT

A child seat mount assembly, a seat for mounting a child seat, and a passenger vehicle having a stowable child seat are provided. A seat back is connected to the body for closing an access opening to a storage compartment and seating an occupant in an upright position, and for opening the access opening in a collapsed position. A child seat mounting plate is connected to the seat back such that the mounting plate and child seat extend into the storage compartment in the upright position of the seat back, and such that the child seat is in a seating position in the collapsed position of the seat back. A method is provided for converting a vehicle seat for receiving and storing a child seat in the storage compartment, and for deploying a child seat in the collapsed position of the seat back.

14 Claims, 11 Drawing Sheets

U.S. PATENT DOCUMENTS

| | | | |
|---|---|---|---|
| 5,133,589 A * | 7/1992 | Kimura | 297/335 |
| 5,368,355 A * | 11/1994 | Hayden et al. | 296/65.13 |
| 5,403,068 A * | 4/1995 | Fatchett | 297/238 |
| 5,409,293 A * | 4/1995 | Nagasaka | 297/236 |
| 5,429,414 A * | 7/1995 | Olsson et al. | 297/238 |
| 5,498,062 A | 3/1996 | Holdampf | |
| 5,564,780 A | 10/1996 | Presser et al. | |
| 5,568,959 A * | 10/1996 | Weber et al. | 297/238 |
| 5,582,453 A * | 12/1996 | Leuchtmann et al. | 296/65.09 |
| 5,588,700 A | 12/1996 | Homier | |
| 5,601,334 A * | 2/1997 | Marks | 297/238 |
| 5,639,144 A * | 6/1997 | Naujokas | 297/238 |
| 5,662,377 A | 9/1997 | Holdampf et al. | |
| 5,673,971 A * | 10/1997 | Wieclawski | 297/378.11 |
| 5,775,771 A | 7/1998 | La Cour et al. | |
| 5,788,326 A | 8/1998 | Kawade et al. | |
| 6,626,492 B1 | 9/2003 | Uno | |
| 6,698,829 B1 * | 3/2004 | Freijy et al. | 297/188.09 |
| 6,769,735 B1 * | 8/2004 | Winkler | 297/112 |
| 6,773,048 B1 * | 8/2004 | Freeman | 296/63 |
| 6,947,071 B2 | 9/2005 | Eichmann | |
| 7,070,239 B1 | 7/2006 | Ugrekhelidze et al. | |
| 7,073,839 B2 * | 7/2006 | Boyina et al. | 296/65.09 |
| 7,077,463 B2 * | 7/2006 | Sun et al. | 297/15 |
| 7,458,635 B2 * | 12/2008 | Mendis et al. | 297/238 |
| 7,517,016 B1 * | 4/2009 | West et al. | 297/236 |
| 7,766,425 B2 * | 8/2010 | Poniatowski | 297/284.9 |
| 2004/0124678 A1 | 7/2004 | Williams et al. | |

FOREIGN PATENT DOCUMENTS

| | | |
|---|---|---|
| DE | 19732385 C2 | 1/1999 |
| EP | 0770516 A2 | 5/1997 |
| EP | 1787855 A1 | 5/2007 |
| FR | 2741847 A1 | 6/1997 |
| JP | H09030298 A | 2/1997 |
| JP | H09118161 A | 5/1997 |
| JP | 2001191825 A | 7/2001 |
| JP | 2004106785 A | 4/2004 |
| WO | 2006087719 A1 | 8/2006 |

* cited by examiner

STOWABLE CHILD SEAT FOR AUTOMOTIVE VEHICLES

CROSS-REFERENCE TO RELATED APPLICATIONS

This application is a division of U.S. application Ser. No. 11/844,655 filed Aug. 24, 2007, now U.S. Pat. No. 7,658,431, the disclosure of which is incorporated in its entirety by reference herein.

BACKGROUND

1. Technical Field

The invention relates to child seats for automotive vehicles, automotive vehicles having stowable child seats, assemblies for mounting child seats in vehicles, and methods of manufacturing automotive seats for stowing child seats.

2. Background Art

The prior art has offered child seats that are installed into vehicles, including mounting hardware within the vehicle, such as anchor hoops for mounting a child seat or child seat base within a vehicle. The prior art has also offered child seats that are stowed within seating of the vehicle, which can be deployed for use.

Another offering of the prior art is to mount a child seat to a back surface of a seat back within a vehicle. The prior art also provides a collapsible child seat on a back surface of a seat back to be collapsed and stowed into a trunk when not in use.

SUMMARY

One embodiment of the invention discloses a passenger vehicle having a vehicle body with a passenger compartment and a storage compartment adjacent to and rearward of the passenger compartment. A seat is oriented in the passenger compartment adjacent to the storage compartment and having a first seating position and a second seating position. The first seating position includes a seat back disposed generally vertical to provide a seating surface in the passenger compartment and includes a bracket adapted to receive a child seat pivotably transverse connected to the seat back and disposed in the storage compartment. The second seating position including the bracket disposed in the passenger compartment.

Another embodiment of the invention discloses a seating system having a seat back arranged in a generally vertical inclined position including a bracket for a child seat attached thereto such that the child seat attached thereto lies generally flat on the vehicle floor near the seat back. The seat back is translatable into a generally horizontal position whereby the bracket for a child seat translates therewith and is rotatable from a position permitting a rearward facing child seat configuration and to a forward facing child seat configuration.

Another embodiment of the invention discloses a seating system having a seat back adjustable from a first child seating position to a second seating position. A bracket for receiving a child seat is pivotally attached to the seat back at its first end and pivotally linked to a vehicle at its second end, the second end raising in vertical elevation as the seat back is adjusted from the first child seating position to a second seating position thereby limiting the vertical elevation of a child seat received by the bracket.

In yet another embodiment, a passenger vehicle is disclosed with a vehicle body having a passenger compartment and a storage compartment with an access opening between these compartments. A seating row is oriented in the passenger compartment adjacent to the storage compartment, with a seat bottom mounted to the vehicle body and a seat back pivotally connected to the vehicle body for closing the access opening and for seating an occupant in an upright position, and for opening the access opening in a collapsed position, whereby a rear surface of the seat back faces upward. A mounting plate for receiving a child seat is pivotally connected to the seat back such that the mounting plate is supported upon the rear surface of the seat back in the collapsed position of the seat back for positioning the child seat in a seating position for seating a child. An angle between the mounting plate and the rear surface of the seat back diverges at a lower region of the seat back in the upright position of the seat back for positioning the child seat within the storage compartment.

Another embodiment of the invention discloses a vehicle seat having a seat back to be pivotally connected within a passenger compartment of the vehicle adjacent to a storage compartment for seating an occupant in an upright position of the seat back, and for providing access to the storage compartment in a collapsed position, whereby a rear surface of the seat back faces upward. A mounting plate for receiving a child seat is pivotally connected to the seat back such that the mounting plate is supported upon the rear surface of the seat back in the collapsed position of the seat back for positioning the child seat in a seating position for seating a child. An angle between the mounting plate and the rear surface of the seat back diverges at a lower region of the seat back in the upright position of the at least one seat back for positioning the child seat within the storage compartment.

Yet another embodiment of the invention discloses an assembly for mounting a child seat to a rear surface of a vehicle seat back adjacent to a storage compartment for seating an occupant and stowing the child seat in the storage compartment in an upright position of the seat back, and for seating a child in a collapsed position of the seat back. A base plate is pivotally connected about a generally transverse axis to an upper region of the seat back. A balance link is pivotally connected to a lower region of the base plate and is adapted to be pivotally connected to one of the seat back and a floor of the storage compartment to pivot the base plate away from the seat back in the upright position and to pivot the base plate to increase an angle between the base plate and the rear surface of the seat back in the collapsed position. A mounting plate is adapted for receiving a child seat mounted and is rotatably connected to the base plate about an axis that is generally perpendicular to the mounting plate for rotating the child seat to a plurality of positions relative to the seat back and for positioning a high point of the child seat radially inward relative to a pivot axis of the seat back before extending the seat back to an upright position, thereby minimizing a radial range of travel of the child seat.

Another embodiment of the invention is a method for converting a vehicle seat back adjacent to a storage compartment for seating an occupant in an upright position of the seat back, for receiving and stowing a child seat in the storage compartment, and for seating a child in a collapsed position of the seat back. A base plate is pivotally connected to an upper region of the seat back about a generally transverse axis. A balance link is pivotally connected to a lower region of the base plate to pivot the base plate away from the seat back in the upright position and to pivot the base plate to retract on the rear surface of the seat back in the collapsed position. A mounting plate is rotatably connected to the base plate about an axis that is generally perpendicular to the mounting plate, for receiving a child seat and for rotating the child seat to a plurality of positions.

Yet another embodiment of the invention discloses a link for cooperating with a child seat assembly pivotally connected to a rear surface of a seat back that is pivotally connected to a vehicle body. The link has a first end pivotally connected to the child seat assembly and a second end pivotally connected to one of the seat back and the vehicle body to add to an overall radius of the child seat relative to the pivotal connection of the seat back in an upright orientation of the seat back to stow the child seat assembly, and to subtract from an overall radius of the child seat relative to the pivotal connection of the seat back in a collapsed orientation of the seat back to retract the seat assembly upon the rear surface of the seat back.

Other embodiments, features, benefits and uses of the present invention are readily apparent from the detailed description of embodiments of the invention when taken in connection with the accompanying drawings.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting but merely as a representative basis for the claims and/or as a representative basis for teaching one skilled in the art to variously employ the present invention.

Throughout the description the phrase "child seat" generally refers to any child seat that is mounted within the car for transporting a child or infant occupant. Such child seats include but are not limited to rearward facing child seats, forward facing child seats, infant carriers, infant carrier and base combinations, convertible child seats, any commercially available child or infant seats, and the like.

Figure 1:
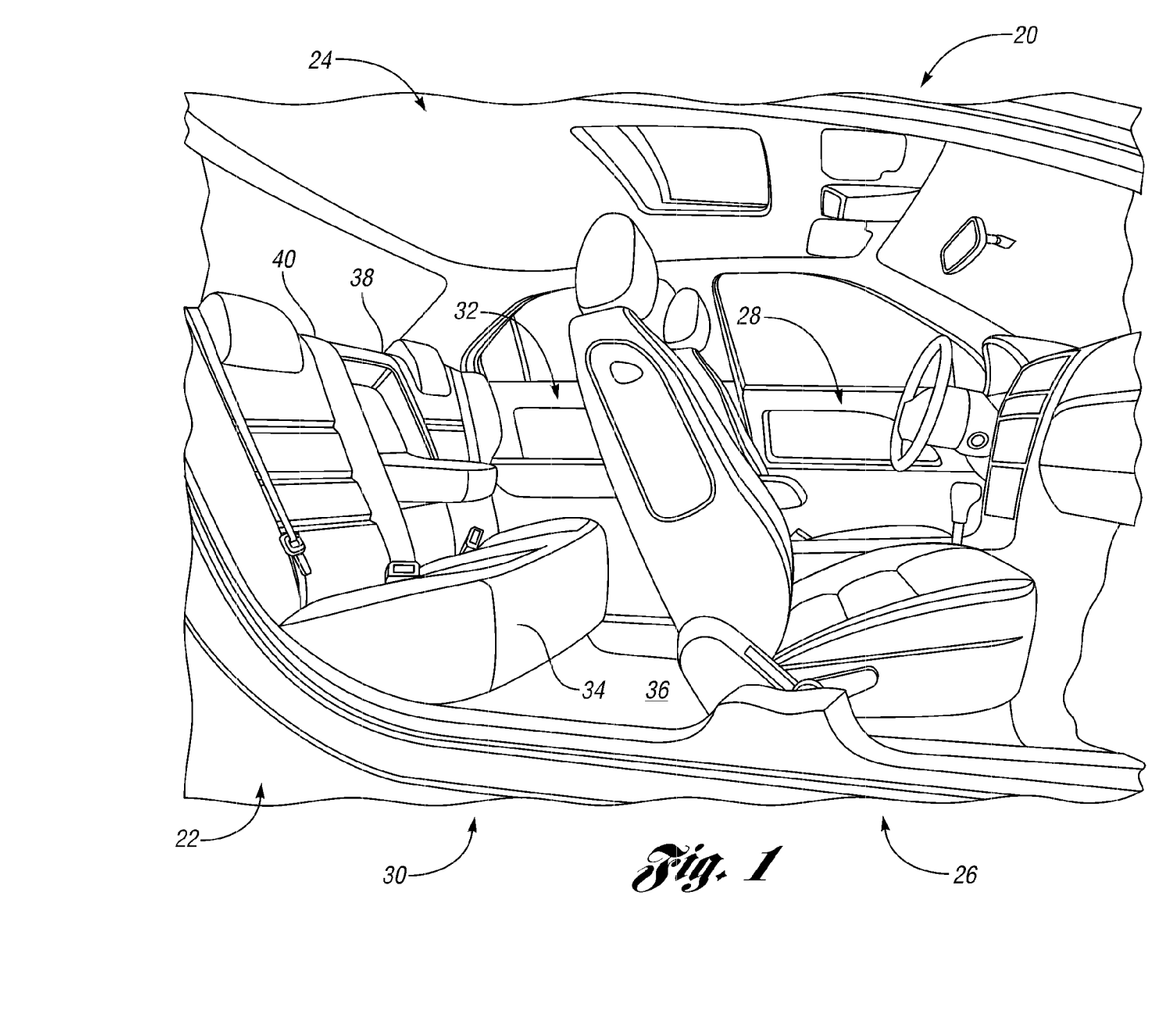
FIG. 1 is a side perspective view of a passenger compartment of a vehicle in accordance with an embodiment of the present invention.

Referring now to FIG. 1, a passenger vehicle is illustrated in accordance with an embodiment of the present invention and is referenced generally by numeral 20. The vehicle 20 has a vehicle body 22 with a passenger compartment 24. The depicted vehicle 20 is a sedan having a front seating row 26 with a pair of front doors 28 providing access for occupant ingress and egress to and from the front seating row 26; and the vehicle 20 has a rear seating row 30 with a pair of rear doors 32 for permitting occupant ingress to and egress from the rear seating row 30. An intermediate pillar between the front door 28 and the rear door 32 is removed on the near side of the illustration to reveal the passenger compartment 24. Although a sedan is depicted and described, the invention contemplates utilization of any passenger vehicle for mounting a child seat for transporting a child, such as coupes, vans, trucks, sport utility vehicles and the like. Although two seating rows 26, 30 are illustrated, the invention contemplates any number of seating rows wherein a child seat is employed.

Figure 2:
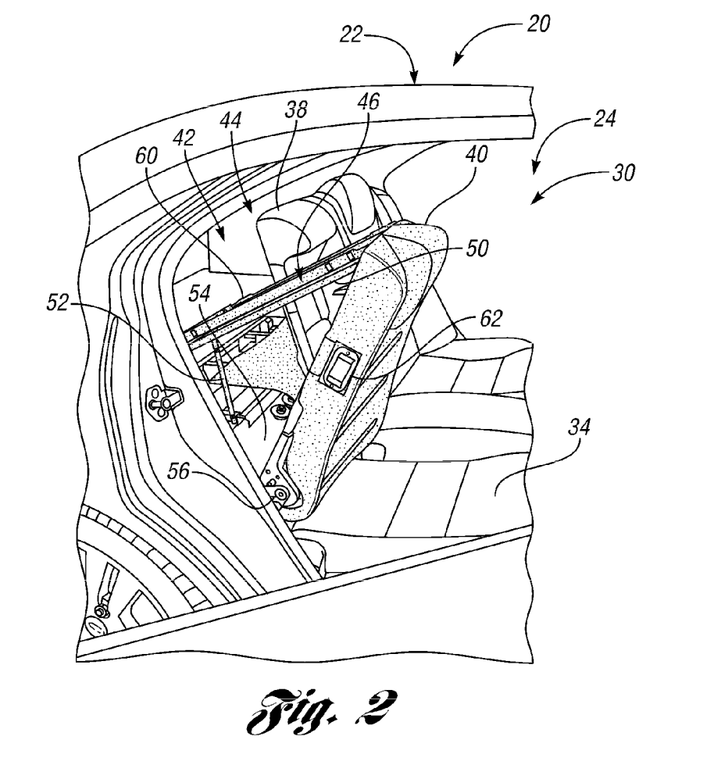
FIG. 2 is a partial perspective view of a rear seating row of the passenger compartment of FIG. 1, illustrating a seat back in an intermediate position.
Figure 3:
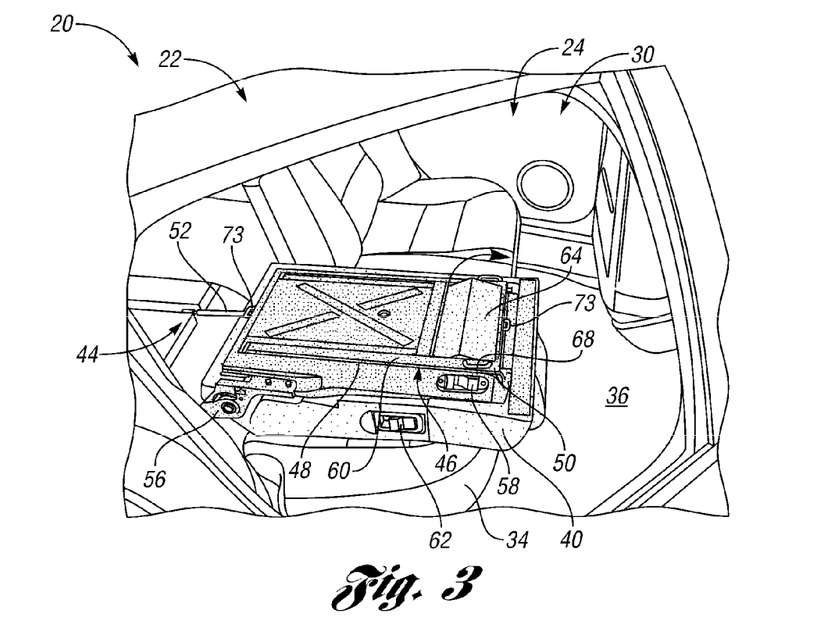
FIG. 3 is a perspective view of the rear seating row of FIG. 2, illustrating the seat back in a collapsed position.

Referring now to FIGS. 1-3, the rear seating row 30 is depicted as a bench seat for seating a plurality of occupants, for example, up to three occupants. Of course, the invention contemplates various seating styles and configurations and is not limited to bench seats. The rear seating row 30 has a bench seat bottom 34 extending across the rear seating row 30 and mounted to a floor 36 of the passenger compartment 24.

A bench seat back is collectively provided by a primary seat back 38 and a secondary seat back 40. Each of the seat backs 38, 40 are pivotally connected to the vehicle body 22 adjacent to a storage compartment such as a trunk 42 (FIG. 2) so that when one of the seat backs 38, 40 is pivoted to a collapsed position, such as the collapsed position of the secondary seat back 40 in FIG. 3, access to the trunk 42 is permitted. Although a trunk is illustrated as the storage compartment, the invention contemplates utilization of any passenger vehicle storage compartment for stowing a child seat within the spirit and scope of the present invention. Access to the trunk 42 is provided by the vehicle body 22, which has an access opening 44 between the passenger compartment 24 and the trunk 42 for extending storage within the trunk 42 into the passenger compartment 24 if necessary.

The bench seat of the rear seating row 30 is depicted having the pair of seat backs 38, 40, wherein the primary seat back 38 provides the seat back for a rear driver side seat and a rear middle seat. The secondary seat back 40 provides a seat back for a rear passenger side seat. Seating configurations that employ a primary and secondary seat backs 38, 40 for a bench seat are often referred to as a sixty/forty seat, since the primary seat back 38 provides approximately sixty percent of the bench seat back and the secondary seat back 40 provides approximately forty percent of the bench seat back. Of course, the invention contemplates any number of seat backs in accordance with the present invention.

Referring now to FIGS. 2 and 3, a child seat mount assembly 46 is illustrated mounted to a rear surface 48 of the secondary seat back 40. The child seat mount assembly 46 is connected to the rear surface 48 of the secondary seat back 40 for mounting a variety of child seats upon the assembly 46. Additionally, the child seat mount assembly 46 is utilized to stow the assembly 46 and the associated child seat within the trunk 42 when not in use.

In at least one embodiment, the child seat mount assembly 46 includes a base plate 50 pivotally connected to an upper region of the secondary seat back 40 to retract and lay flat upon the rear surface 48 of the seat back 40 as illustrated in FIG. 3 for receiving the child seat. Additionally, the base plate 50 pivots relative to the secondary seat back 40, as illustrated in an intermediate position in FIG. 2, to stow the child seat in the trunk 42.

A balance link 52 is pivotally connected to a floor 54 of the trunk 42 and is also pivotally connected to a lower region of the base plate 50 to extend the base plate 50 away from the secondary seat back 40 in the stowed position and to retract the base plate 50 upon the rear surface 48 of the seat back 40 in the collapsed position of the seat back 40 as illustrated in FIG. 3. Although a single balance link 52 is depicted, the invention contemplates any number of balance links, such as a pair of balance links to structurally enhance the connection. Although the balance link 52 is illustrated as a rod, the balance link 52 could be a panel hinged along the base plate 50.

Although the child seat assembly 46 is illustrated connected to the trunk floor 54, the child seat assembly 46 can be connected to any component in the vehicle body 22, or could have another connection with the seat back 40 for facilitating the stowed and deployed positions of the child seat assembly 46.

In the collapsed orientation of the secondary seat back 40, the rear surface 48 is aligned generally coplanar with the trunk floor 54 and therefore the floor 36 of the passenger compartment 24 is oriented below the trunk floor 54. Thus, the rear surface 48 of the seat back 40 provides an extension of a load floor provided by the trunk floor 54 when cargo is loaded to extend from the trunk 42 into the passenger compartment 24. When the seat back 40 is pivoted to the upright position as illustrated in FIG. 1, the seat back 40 is pivoted past a vertical position providing an acute angle between the seat back 40 and the trunk floor 54. By extending the bottom of the base plate 50 away from the seat back 40, interference of the child seat against the load floor 54 is prevented.

The secondary seat back 40 is pivotally connected to the floor 36 of the passenger compartment 24 by a recline mechanism 56. The recline mechanism 56 may be any known recline mechanism, however instead of locking in the upright position only, the recline mechanism 56 locks in the upright position illustrated in FIG. 1 and the collapsed position in FIG. 3. The recline mechanism is unlocked from these two locked positions by a release lever 58 oriented on the rear surface 48 of the secondary seat back 40. The release lever 58 may cooperate with the recline mechanism 56 by a cable within the secondary seat back 40. For example, the release lever 58 may retract a spring biased locking pin that engages the seat back 40 at two locked positions, upright and collapsed. By locking the secondary seat back 40 in the collapsed position of FIG. 3, a fixed seating position is provided for the child seat mount assembly 46.

With reference to FIG. 3, the child seat mount assembly 46 includes a mounting plate 60 for mounting the child seat. The mounting plate 60 is pivotally connected to the base plate 50 for pivoting about an axis that is generally perpendicular to the plates 50, 60 for providing various seating positions of the child seat and for permitting installation of the child seat in one position and subsequent rotation to another position. The pivotal connection also permits child ingress and egress to the child seat in one position of the child seat in subsequent seating of another position. Further, the pivotal connection permits rotating the child seat until a high point of the child seat is radially inward for minimizing a radial range of travel of the child seat as it is being stowed. In other words, the child seat is oriented forward facing before being stowed so that the seat back of the child seat is oriented closer to the recline mechanism 56 with respect to a rearward facing direction. A locking mechanism is provided between the mounting plate 60 and the base plate 50 for locking the mounting plate 60 in the seating position. A release lever 62 is provided on a side of the seat back 40 for releasing the locking mechanism for pivoting the mounting plate 60 relative to the base plate 50.

Figure 4:
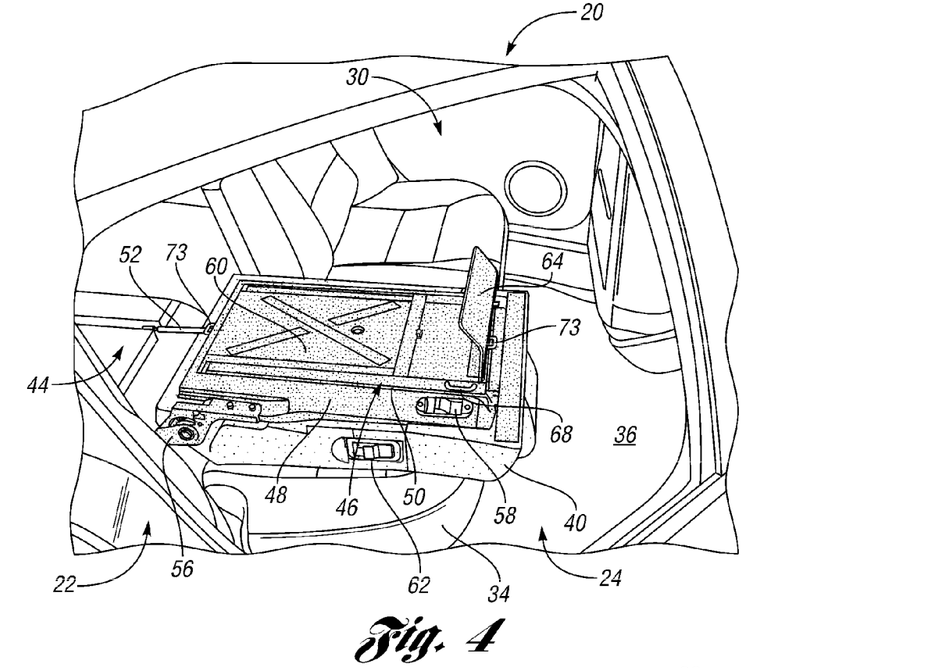
FIG. 4 is another partial perspective view of the rear seating row, illustrating the seat back in the collapsed position and a reaction plate in an extended position.

Conventional child seats are anchored to an existing car seat in surface contact with the associated seat bottom and seat back in the upright position of the seat back. Since the seat back 40 is collapsed for receiving the child seat, a reaction plate 64 is provided by the child seat mount assembly 46 for supporting the child seat in a longitudinal direction of the vehicle. The reaction plate 64 is pivotally connected to the mounting plate 60 and is illustrated in a stowed position in FIG. 3. Referring now to FIG. 4, the reaction plate 64 is illustrated in an extended position for receiving an associated child seat. The reaction plate 64 and mounting plate 60 are illustrated in an opposed direction to that of the seating direction, for receiving a child seat to be subsequently mounted in a rearward facing direction.

Figure 5:
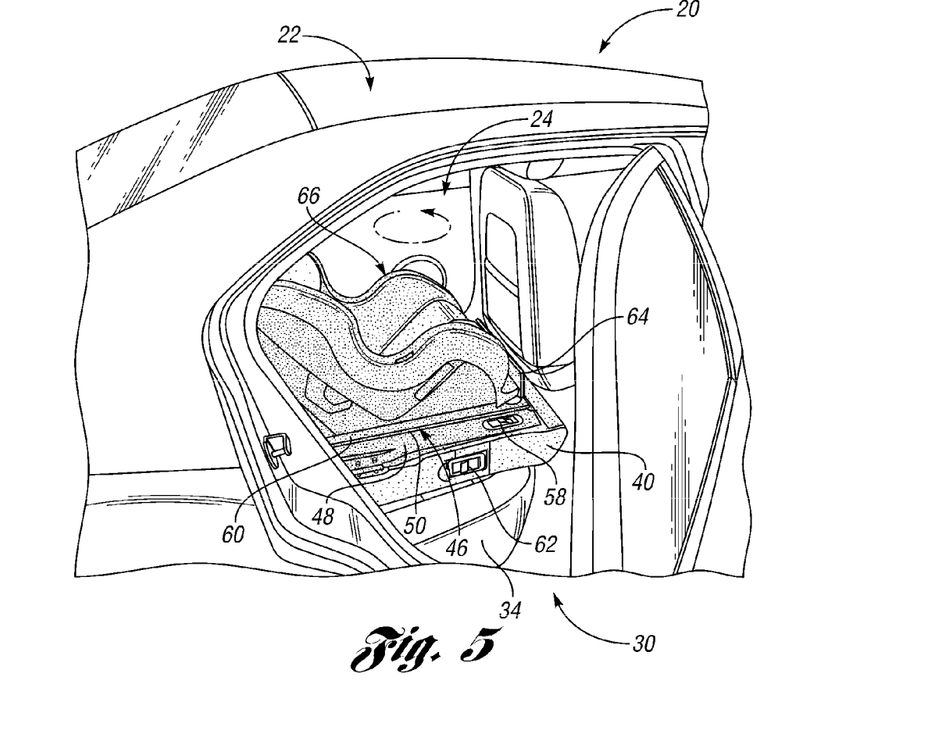
FIG. 5 is another partial perspective view of the rear seating row, illustrating a child seat in a first position during installation to the rear seating row.

Referring now to FIG. 5, a child seat 66 is illustrated installed upon the mounting plate 60 of the child seat mount assembly 46. The child seat 66 can be any conventional child seat for installation into a vehicle. Specifically the child seat 66 depicted is for rearward facing and therefore the child seat 66 is installed with a front portion disposed beneath the reaction plate 64. The position of the mounting plate 60 and the reaction plate 64 in FIG. 5 may be utilized for installing the child seat 66 into the vehicle 20, or for ingress and egress of a child occupant to and from the child seat 66.

Figure 6:
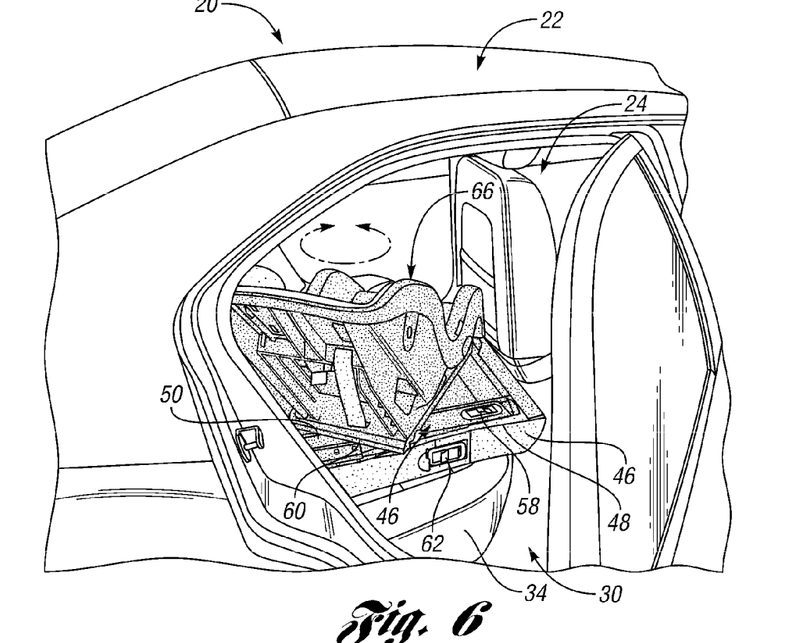
FIG. 6 is another partial perspective view of the rear seating row, illustrating the child seat in an intermediate position.

Once the child seat 66 is installed and the child occupant in seated, a passenger may actuate the release lever 62 for unlocking the mounting plate 60 and for rotating the mounting plate 60. With reference to FIG. 6, the child seat 66 and mounting plate 60 are illustrated in an intermediate position as the child seat 66 and mounting plate 60 are rotated to a rearward facing direction, which is illustrated in FIG. 7.

Figure 7:
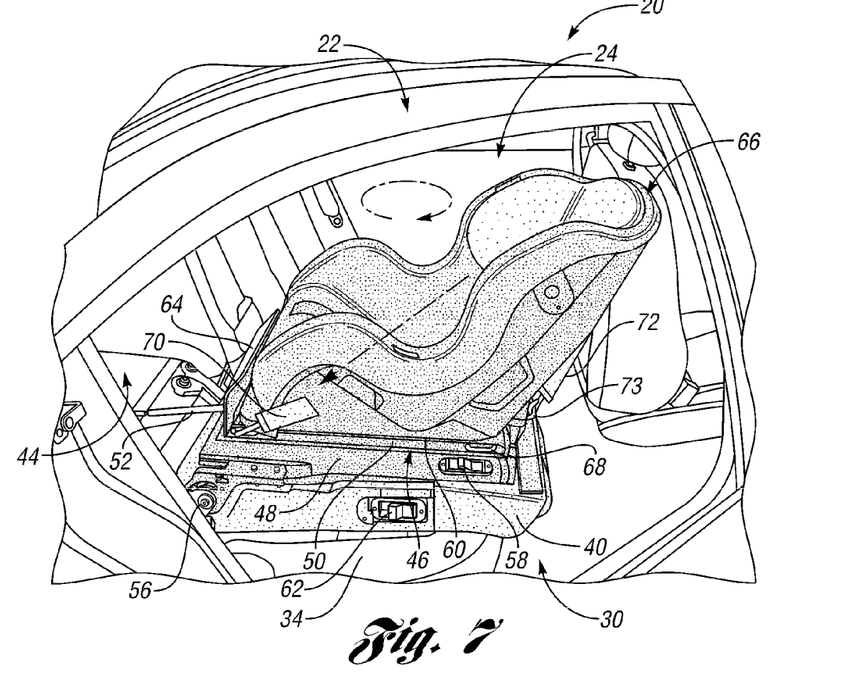
FIG. 7 is another partial perspective view of the rear seating row, illustrating the child seat installed in a rear facing position.

In FIG. 7, the child seat 66 is illustrated installed and locked in a rearward facing position. The mounting plate 60 includes a plurality of hoops 68, specifically four hoops 68 each at one of the four corners of the mounting plate 60. The rearward hoops 68 are oriented adjacent to the reaction plate 64 for providing an anchoring position similar to that of anchoring hoops that are typically provided between a seat back and seat bottom. Belts 70 of the child seat 66 are anchored to the hoops 68 and are tightened such that the child seat 66 is anchored down against the mounting plate 60 and rearward against the reaction plate 64. Thus, when the belts 70 are in tension, the child seat 66 is anchored down in a direction that is illustrated by the arrow in FIG. 7. This mounting condition is the same structurally as that of a child seat sitting upon a seat bottom with the belts connected to anchor hoops in tension with the front of the child seat against the seat back. Thus, the child seat 66 gets the same support from the child seat mount assembly 46 in comparison to the prior art mounting configurations.

Conventional child seats that are utilized in both rearward facing and forward facing directions are often provided with hooked belts 70 for mounting in the rearward facing direction and a centrally mounted hooked belt 72, often referred to as a tether, which can be connected to an anchor hoop that is mounted on the floor of the passenger compartment 24. Accordingly, a hoop 73 is provided centrally at a forward region of the mounting plate to connect the tether 72 as illustrated in FIG. 7. By providing the hoop 73 at the forward location on the child seat mount assembly 46, the belt 72 can be connected close to the child seat 66 thereby providing a compact mounting configuration that does not extend to the floor.

The belts 70 anchor the child seat 66 to the child seat mount assembly 46 for support during a crash in a forward direction. The child seat 66 may alternatively include a pair of belts extending from a rear side of the child seat 66 to be connected to the forward hoops 68. The belts are tightened to anchor the rear of the child seat 66 to withstand accelerations from a rearward direction, such as a rear end impact.

Figure 8:
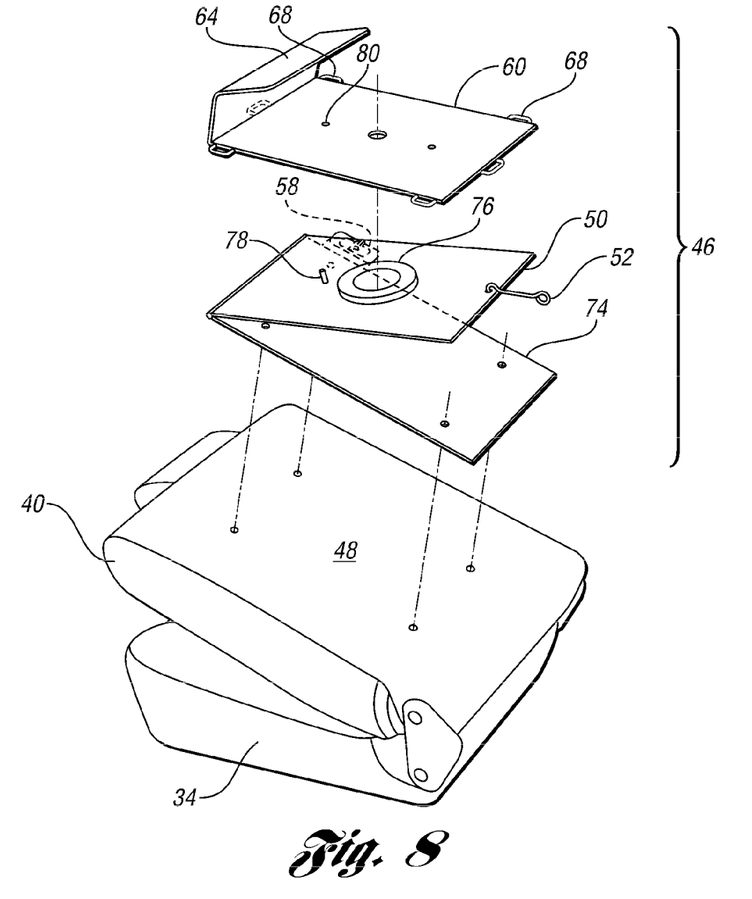
FIG. 8 is a partial exploded perspective view of a child seat mounting assembly and a vehicle seat.
Figure 9:
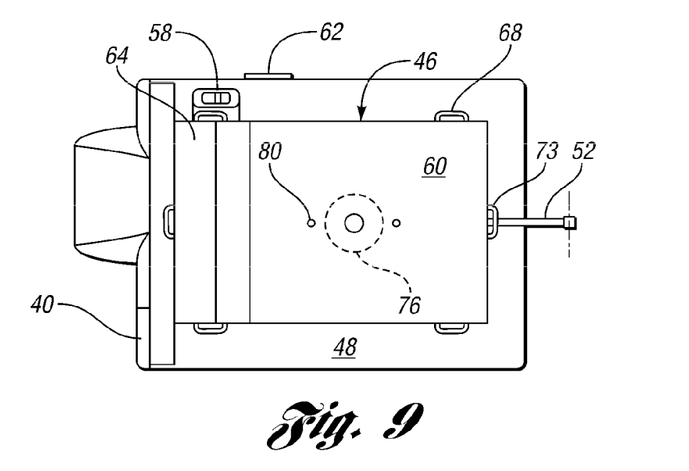
FIG. 9 is a top plan view of the collapsed vehicle seat of FIG. 8.

Referring now to FIG. 8, the child seat mount assembly 46 is illustrated partially exploded. The child seat mount assembly 46 includes a bracket 74 that is fastened to a frame within the seat back 40. Although the bracket 74 is illustrated substantially along the rear surface 48 of the seat back 4, the invention contemplates any bracket size adequate to secure the assembly 46 to the seat back 40. For example, the bracket 74 may be limited in area to a top region of the seat back 40.

The base plate 50 is pivotally connected to the bracket 74 about a transverse axis at the upper region of the bracket 74. The balance link 52 is pivotally connected to a lower end of base plate 50 and is also pivotally connected to the trunk floor 54 for extending the base plate 50 from the bracket 74 in the stowed position and for collapsing the base plate 50 upon the bracket 74 in the collapsed position of the seat back 40.

A bearing assembly 76 connects the mounting plate 60 to the base plate 50 for permitting the mounting plate 60 to pivot to various positions relative to the base plate 50, while providing bearing support to the mounting plate 60 and the child seat 66. The release lever 62 releases a spring loaded locking pin 78 to unlock the mounting plate 60. The locking pin 78 is spring loaded to extend into one of two apertures 80 formed in the mounting plate 60. In one embodiment, the release lever 62 is mounted to a side of the bracket 74, as depicted for release lever 58, with a cable extending beneath the base plate 50 for cooperating with the locking pin 78. Four corner hoops 68 and two central hoops 73 are provided on the mounting plate 50 to provide a universal mounting configuration for various child seats.

The child seat mount assembly 46 is a compact assembly that can be installed into the vehicle by fastening the assembly 46 to the seat back 40 and assembling the balance link 52 to one of the seat back 40 and the vehicle body 22. The trunk floor 54 may be utilized, as in the present embodiment, due to existing mounting hardware for the rear seating row 30. Thus, the child seat mount assembly 46 can be assembled during assembly of the vehicle, assembled during assembly of the seats for the vehicle, or installed in the aftermarket. In order to accommodate these options, the pivotal connection for the trunk floor 54 can be provided in the production vehicle by providing an aperture in an existing bracket, or the pivotal connection could be a bracket that is installed in the aftermarket. Likewise, the child seat mount assembly 46 can be fastened to the seat back 40 by screwing the bracket 74 into the frame of the seat back 40.

When the child seat 66 is no longer in use, the child seat 66 can be stowed in the trunk 42. Referring again to FIG. 7, when the child seat 66 is in the rearward facing direction, the highest point of the child seat 66, which is the top rear head support region, is at an outward most radial dimension relative to the recline mechanism 56. In order to minimize a radial path of the child seat 66, the child seat 66 is rotated back to a forward facing direction as illustrated in FIG. 5.

Figure 10:
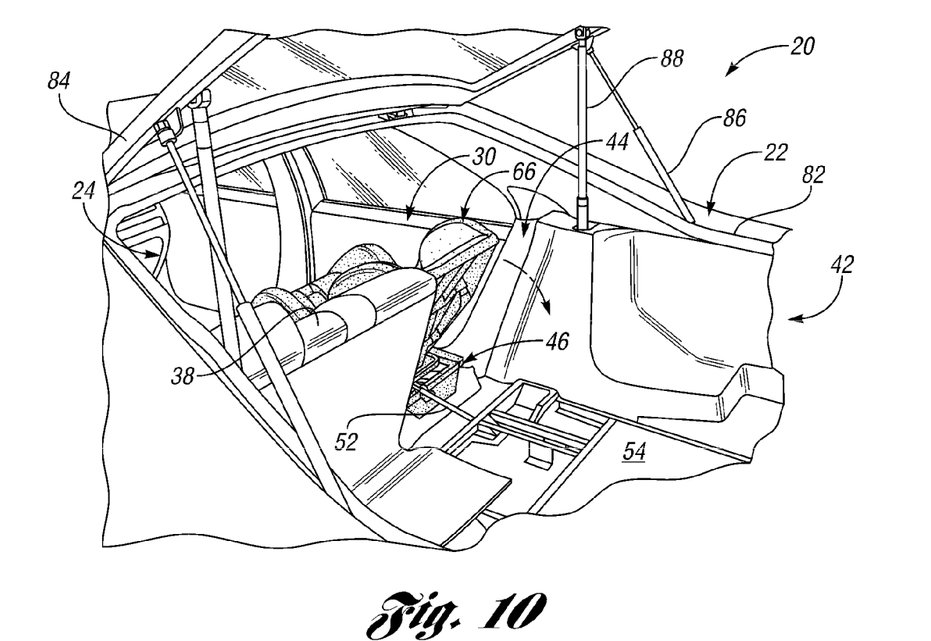
FIG. 10 is a rear perspective view of a storage compartment of the passenger vehicle of FIG. 1.

Referring now to FIG. 10, the vehicle 20 is illustrated as a hatchback with a hatchback opening 82 and a hatch door 84 pivotally connected to the vehicle body 22. The hatch door 84, in at least one embodiment, may be opened before stowing the child seat 66 in order to provide additional clearance for the movement of the child seat 66. In another embodiment, additional clearance is not required. The hatch 84 may be provided in the open orientation by a series of gas shocks 86. In another embodiment, the hatch 84 may be power driven by a pair of actuators 88, which may be pneumatic cylinders, hydraulic cylinders, motor driven lead screws, or any suitable actuator.

Figure 11:
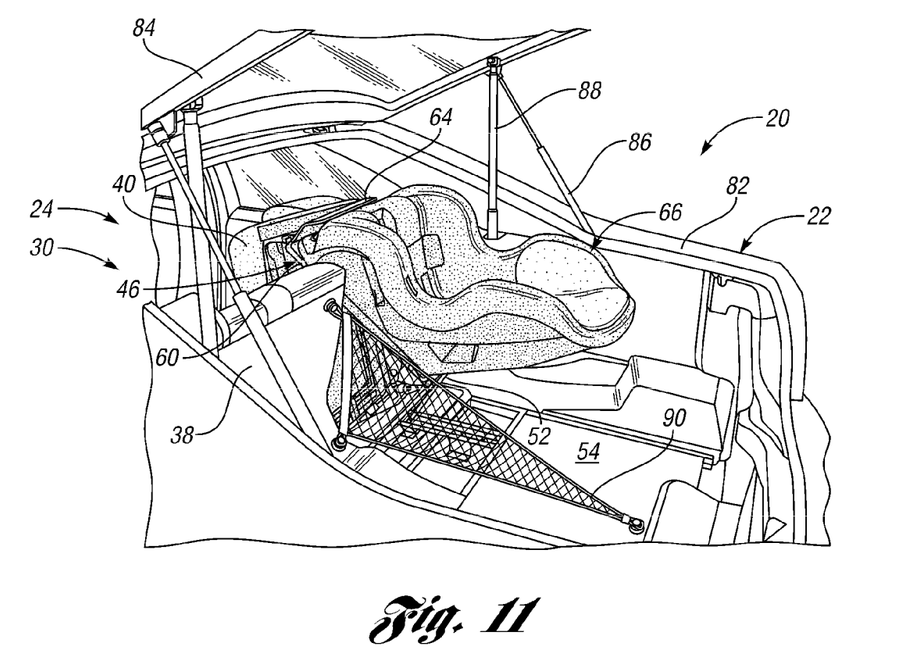
FIG. 11 is another rear perspective view of the storage compartment of the passenger vehicle of FIG. 1, illustrating the child seat in a partially stowed position.

In FIG. 10, the child seat 66 is illustrated forward facing with the seat back 40 in the collapsed position. In order to stow the child seat 66, the user actuates the release lever 58 to unlock the seat back 40 and pivots the seat back 40, as illustrated by an intermediate position in FIG. 11. As illustrated in FIG. 11, when the seat back 40 is tilted rearward, the balance link 52 extends the child seat 66 and the base and mounting plates 50, 60 away from the rear surface 48 of the seat back 40 to avoid interference of the child seat 66 against the trunk floor 54.

A cargo net 90 is illustrated in the trunk 42 in FIG. 11, which may be utilized to separate the stowed child seat 66 from any cargo that may be stored in the trunk 42. Likewise, the cargo net 90 can be utilized to keep cargo out of the region for stowing the child seat 66 so that the user can stow the child seat 66 without having to move cargo within the trunk 42.

Figure 12:
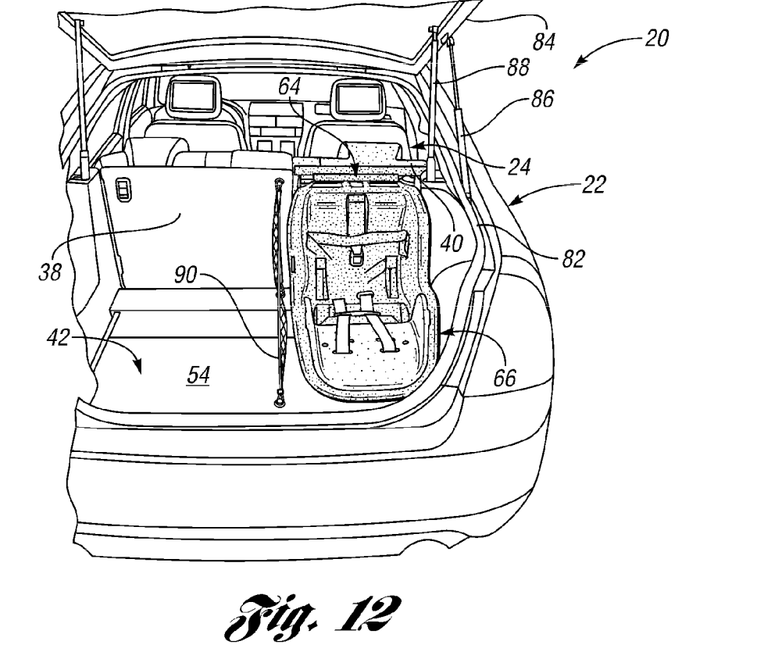
FIG. 12 is a rear perspective view of the storage compartment of the passenger vehicle of FIG. 1, illustrating the child seat in the stowed position.

Referring now to FIG. 12, the child seat 66 is illustrated in the stowed position, with the seat back 40 in the upright position. Although one child seat 66 and one child seat mount assembly 46 are illustrated, the invention contemplates that a pair of child seat mount assemblies 46 can be utilized in accordance with the present invention. Thus, another child seat mount assembly 46 can be mounted to the primary seat back 38 for receiving another child seat.

The seat back 40 can be redeployed by actuating the release lever 62, and pivoting the seat back 40 to the collapsed position thereby conveying the child seat 66 from the stowed position to the deployed position of FIG. 10. Then, the child seat 66 can be rotated back to the rearward seating position illustrated in FIG. 7.

Figure 13:
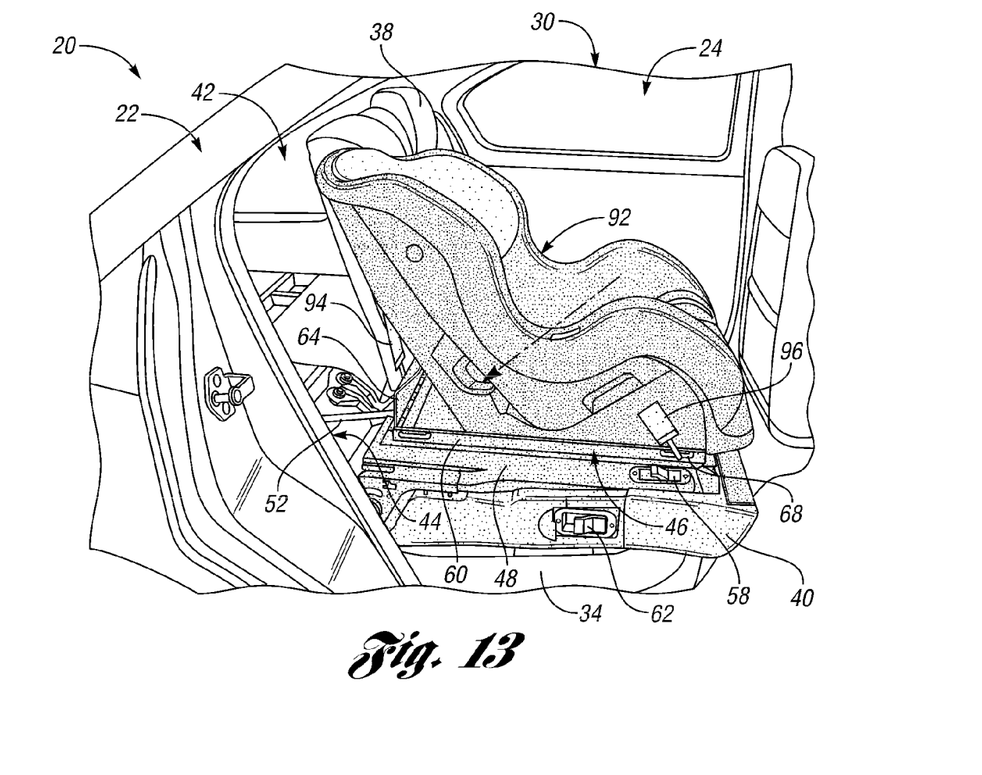
FIG. 13 is a partial perspective view of the rear seating row of the vehicle of FIG. 1, illustrating the seat back in the collapsed position and the child seat installed in a forward facing position.

The child seat mount assembly 46 includes the hoops 68 in the regulated positions for mounting all standard and commercially available child seats. Referring now to FIG. 13, the child seat mount assembly 46 is illustrated for mounting a forward facing child seat 92. Forward facing child seats such as the child seat 92 are utilized for seating upon a seat bottom with a seat back of the child seat 92 engaging a seat back in the vehicle. Additionally, a hooked belt 94 is utilized for connecting the forward facing child seat 92 to a rear mounting location, such as a hoop on a package tray or a hoop on a back surface of the associated seat back.

The child seat 92 is supported upon the mounting plate 60. The reaction plate 64 is provided in the extended position for engaging a rear surface of the child seat 92. The belt 94 is connected to the rearward hoop 73, and the belt 94 tightened in tension such that the child seat 92 is secured in a vector illustrated by the arrow in FIG. 13, which is the same support provided by a conventional seat bottom and seat back. Additionally, the child seat 92 may be provided with another pair of hooked belts 96 for securing to a forward pair of hoops 68 for securing the child seat 92 for a rear end impact. If the child seat 92 is provided with a central belt in a forward region of the child seat 92, for mounting to the floor, the belt can be connected to the forward central hoop 73 (FIGS. 3 and 4).

The forward facing child seat 92 can also be stored in the trunk 42 by unlocking the seat back 40 and pivoting the seat back 40 to the upright position as discussed above with the prior embodiment child seat illustrated in FIG. 10-11. Likewise, the child seat 92 can be redeployed from storage by unlocking the seat back 40 and pivoting the seat back to the collapsed position.

Figure 14A:
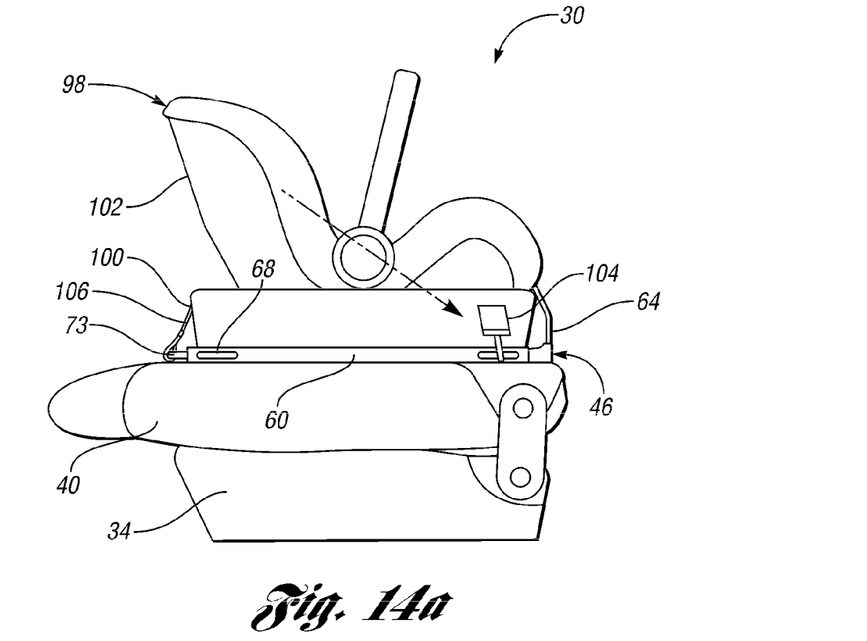
FIG. 14a is a side elevation view of the vehicle seat of FIG. 8 illustrated in the collapsed position, with a child carrier and base installed to the vehicle seat in a rear facing position.

Referring now to FIG. 14a, the child seat mount assembly 46 can also be utilized with a child seat 98 that includes a base 100 and a detachable child carrier 102. These child seats 98 are often utilized for smaller children, such as newborns and infants up to a predefined weight, such as twenty-five pounds. The base and carrier child seats 98 have a detachable carrier 102 for carrying the infant outside of the vehicle 20. Thus, the base 100 is mounted within the vehicle 20 and the carrier 102 is attached to the base 100 for transportation of the child occupant. These child seats 98 are also provided with hooked belts 104 on the base 100 for connecting the base 100 to the anchor hoops 68. Conventional base and carrier child seats such as the child seat 98 are supported by the base 100 resting upon the seat back. The belts 104 are tightened to secure the base 100 against the seat back such that the child seat 98 is secured in a vector illustrated by the arrow in FIG. 14. Likewise, when installed upon the child seat mount assembly 46, the base 100 is secured against the reaction plate 64 for providing equivalent support as that provided by a seat back.

The carrier 100 may include a forward hooked belt 106 for connecting the base 100 to the floor of the passenger compartment. Accordingly, the belt 106 can be connected to the hoop 73 for providing support in case of a rear impact without having to occupy space on the floor.

The child seat 98, or just the base 100, can also be stored in the trunk by rotating the child seat 98 to face forward and then by unlocking the seat back 40 and pivoting the seat back 40 to the upright position, as illustrated and described with reference to FIGS. 10-12 with the prior embodiment.

Figure 14B:
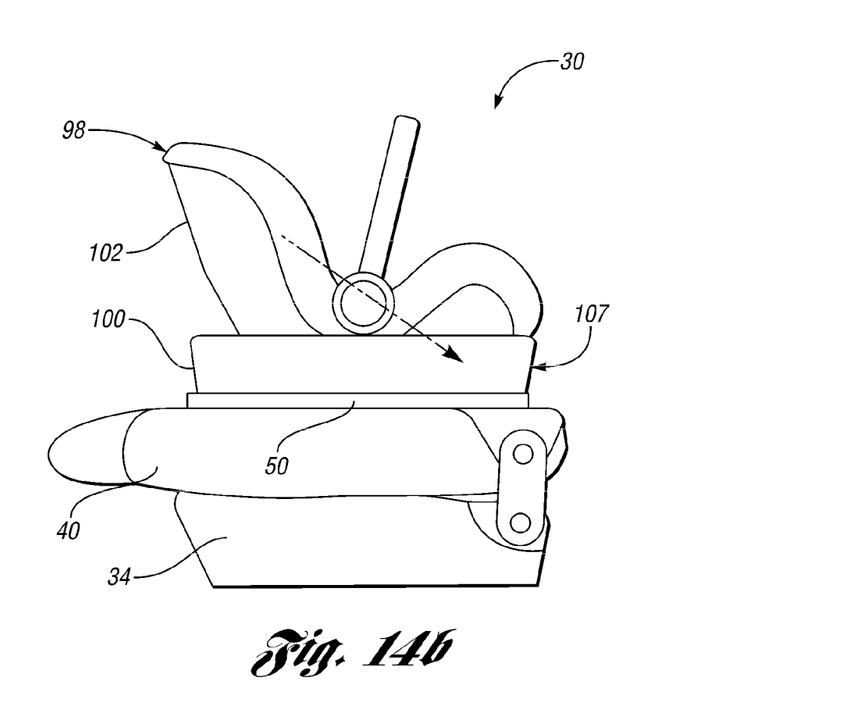
FIG. 14b is a side elevation view of the vehicle seat of FIG. 8 illustrated in the collapsed position, with a child carrier installed to the vehicle seat in a rear facing position.

With reference now to FIG. 14b, a child seat mount assembly 107 may also be provided with a base 100 in an alternative embodiment. The base 100 may be mounted directly to the base plate 50 thereby eliminating the mounting plate 60 as depicted. Alternatively, the base 100 may be fastened to the mounting plate 60. As yet another alternative, the base 100 can be formed integrally with the mounting plate 60. Thus, the base 100 can be incorporated into the child mount assembly 107 to support the carrier 98 in the required vector without having to utilize the belts 104, 106.

The child seat mount assembly 46 overcomes many of the shortcomings of the prior art options. Prior art child seats that are mounted to a seat are typically difficult and time consuming to correctly install. Therefore, once the prior art child seat or base is properly installed, the user is hesitant or unlikely to uninstall the child seat for seating other occupants. Therefore, once a child seat is installed, the seating is typically limited to a fewer number of ordinary sized occupants. Additionally, parents when traveling without their child, have a child seat or child seat base mounted within the car which obfuscates the ornamental appearance of the vehicle interior.

Since prior art child seats are installed in the included angle provided between the seat bottom and the seat base, the child seat, in some vehicles, extends sufficiently forward in the rearward facing position thereby limiting a rearward position of a seat in the front seating row, or tilt angle in the front seating row, thereby compromising front row leg room, or front row recline. The child seat assembly 46 is oriented rearward in comparison to prior art child seat installations because the collapsed seat back 40 does not provide a rearward limitation to the orientation of the child seat. Since the child seat assembly 46 orients the associated child seat further rearward than is permitted in prior art mountings, compromises to front row leg room and recline are minimized.

When child seats are mounted upon the seat bottom in engagement with the seat back, under tension by the associated belts, permanent deformation may be imparted to the surfaces of the seats, particularly to leather seats. Additionally, permanent deformation may be imparted to the underlying foam. These deformation characteristics are overcome by mounting the child seat mount assembly 46 to a non-seating surface, specifically the rear surface 48 of the seat back 40. Additionally, children often spill crumbs or fluids on seats that soil seat surfaces. By seating the child on the rear surface 48 of the seat, soiling of the seat surface upon which the child is seated is avoided.

The prior art has provided child seats incorporated into existing seating rows. Such seating is limited to a specific vehicle, and if a family has multiple vehicles, child seats are still required for the other vehicles. Additionally, such child seats add cost to the vehicle, and consumers are hesitant to pay for child seats when not required. Thus, consumers who subsequently have children after the purchase of the vehicle often utilize child seats and child seat bases that are subsequently installed into the vehicle. The child seat assembly 46 of the present invention permits to consumer to convert the vehicle to a vehicle with a stowable child seat after the purchase of the vehicle. Likewise, the child seat assembly 46 permits automobile dealerships to install the assembly 46 if requested by a consumer.

The prior art has provided child seats that are mounted directly to the seat back. Such configurations are limited to minivans and are not suitable for sedans, because of the raised trunk floor within sedans.

The prior art has also provided collapsible child seats that can be stowed within a trunk. Collapsible child seats are inherently less structurally sound than conventional child seats and require the consumer to purchase a more complicated child seat and therefore more costly child seat, that is not universal and therefore cannot be installed in every vehicle. Further, prior art child seats that are integrated into a vehicle prohibit traveling in different vehicles or flying with the child seat to another destination.

Thus, the child seat mount assembly 46 can be purchased with the purchase of the vehicle and received assembled by the manufacturer. Alternatively, if a consumer has children after the purchase of a vehicle, the consumer can purchase the child seat mount assembly 46 on the aftermarket, such as at the dealer, and have the child seat mount assembly 46 installed into the vehicle 20.

Figure 15:
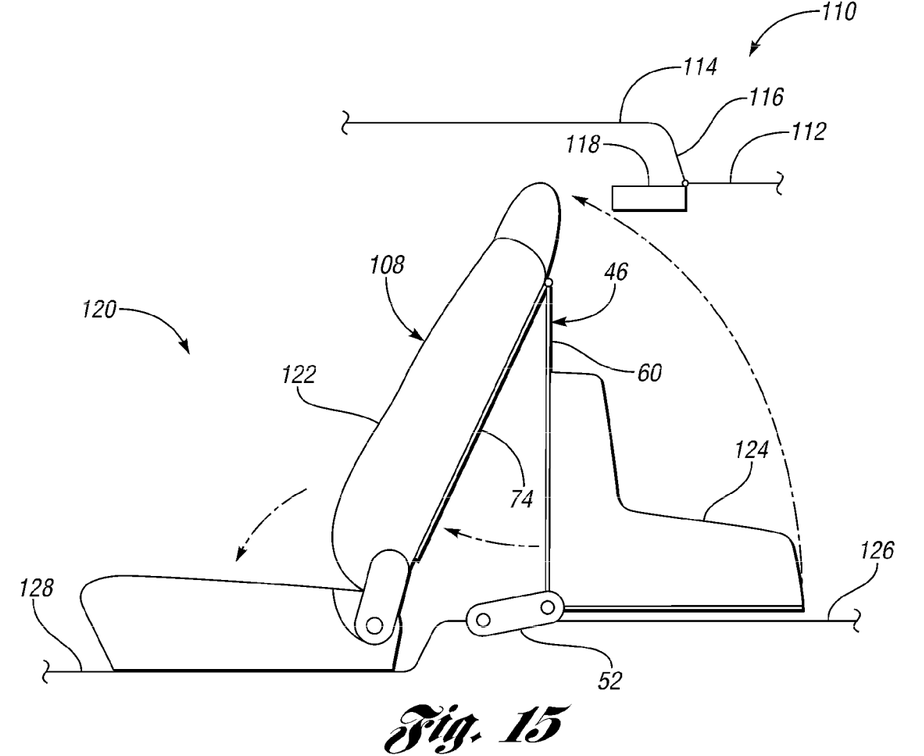
FIG. 15 is a side elevation view of a rear seating row of another passenger vehicle embodiment in accordance with the present invention.

Referring now to FIG. 15, a child seat mount assembly 46 is illustrated mounted to a vehicle seat 108 of another embodiment motor vehicle 110. The vehicle 110 is a sedan having a trunk lid 112 pivotally connected to a vehicle body 114 rearward of a rear window 116. The trunk lid 112 does not provide additional clearance as provided by the hatch door 84 of the prior embodiment. Additionally, a package tray 118 is mounted within the passenger compartment 120 of the vehicle 110. As a seat back 122 of the seat 108 is pivoted to a collapsed position, the balance link 52 collapses the child seat mount assembly 46 thereby subtracting from the radial path of travel of a child seat 124 relative to a pivotal connection of the seat back 122 to clear the trunk lid 112 and package tray 118. Thus, the child seat mount assembly 46 may be utilized with various vehicles, such as hatchbacks and sedans with trunk lids. Likewise, the balance link 52 adds to the radial dimension of the child seat 124 relative to the seat back 122 pivotal connection, thereby extending the child seat 124 and preventing interference with a trunk floor 126, which is oriented higher than a floor 128 of a passenger compartment.

Figure 16:
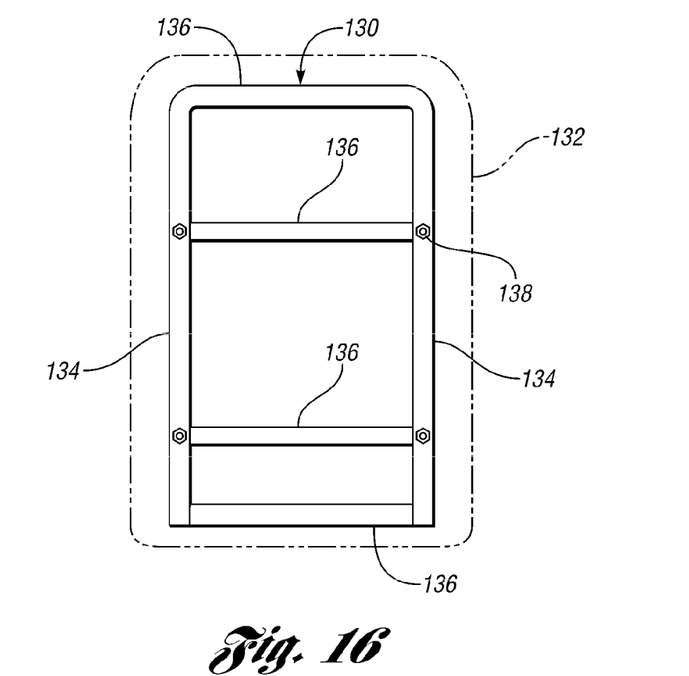
FIG. 16 is a rear elevation view of a frame for a seat back in accordance with the present invention.

Referring now to FIG. 16, a frame 130 for a seat back 132 is illustrated in accordance with the present invention. The frame 130 is formed of a suitable construction including side members 134 and cross members 136. A series of fastening locations are provided on the frame 130 for fastening the child seat mount assembly 46 to the seat back frame 130. In one embodiment, the fastening locations are provided by a series of threaded nuts 138, which are each welded to the frame 130 during assembly of the frame 130. Of course any fastener arrangement, configuration, or number of fasteners is contemplated within the spirit and scope of the present invention. Thus, during assembly of the associated seat, a child seat mount assembly is fastened to the frame 130 by inserting screws into the bracket 74 of the child seat mount assembly 46, into the seat back 132 and in threaded engagement with the nuts 138, thereby securely attaching the child seat to the seat back frame 130.

The fastening locations 138 can be provided standard on seat backs of standard vehicles, where a child seat mount assembly has not been requested. Therefore, if a consumer desires to add a child seat mount assembly 46 after the vehicle has been purchased, the child seat mount assembly 46 can be added by forming holes in a rear material of the seat back 132 and fastening the child seat mount assembly 46 to the frame 130.

Some seat backs may be provided with a rear plate formed of stamped metal, plastic or any suitable material for providing a load floor when the seat back is in the collapsed position. Thus, the plate may be provided with holes that are aligned with the weld nuts 138 for receiving the mounting screws for the child seat assembly 46. The holes may also help the installer identify the locations of the weld nuts 138 to prevent misplacement of pierced holes into a rear covering material on the seat back 132.

Figure 17:
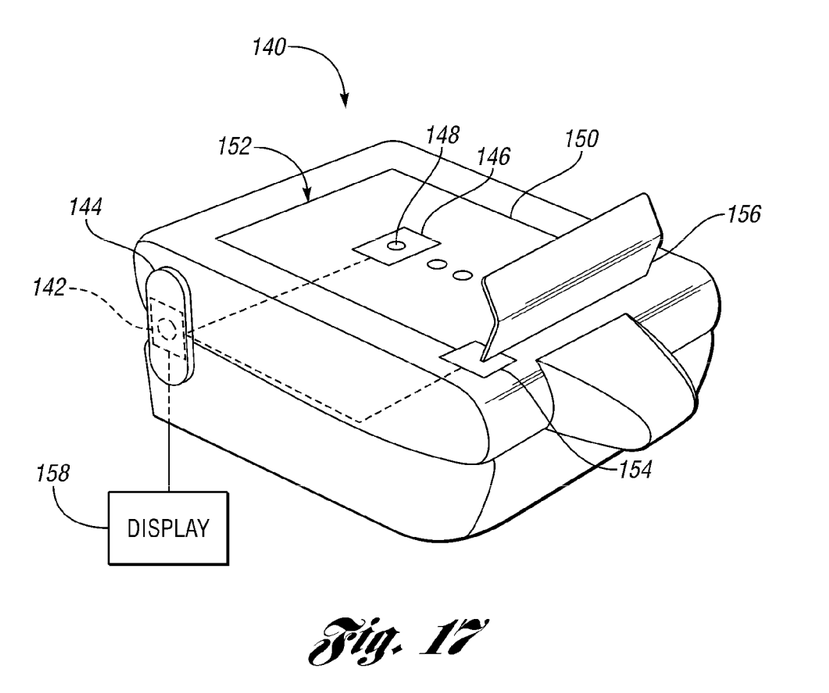
FIG. 17 is a schematic illustration of the seat back, child seat mounting assembly, and a display in accordance with the present invention.

Consumers are often concerned with the status of installation of a child seat. For example, it is common for consumers to have the installation of the child seat inspected by a manual inspector. FIG. 17 illustrates a schematic of a seat back 140, which includes a sensor 142 in a recline mechanism 144 of the seat back 140 to detect if the seat back 140 is fully collapsed and in the locked position. Additionally, a sensor 146 is provided on a locking pin mechanism 148 for confirming that a mounting plate 150 of an associated child seat mount assembly 152 is in a locked position. Additionally, another sensor 154 is provided beneath the mounting plate 150 to determine which direction the mounting plate 150 is facing. The sensor 154 may also measure a position of a reaction plate 156. The sensors 142, 146, 154 are all in communication with a display 158, which is provided in a front seating row of the vehicle, such as front seating row 26 in FIG. 1, for informing the driver that the child seat mount assembly 152 is in a locked position for travel and that the child seat is properly installed. Thus, when the display 158 indicates to the driver which seats are occupied and whether the occupants are buckled, the display 158 also provides an indication that the child seat is installed and secured.

Figure 18:
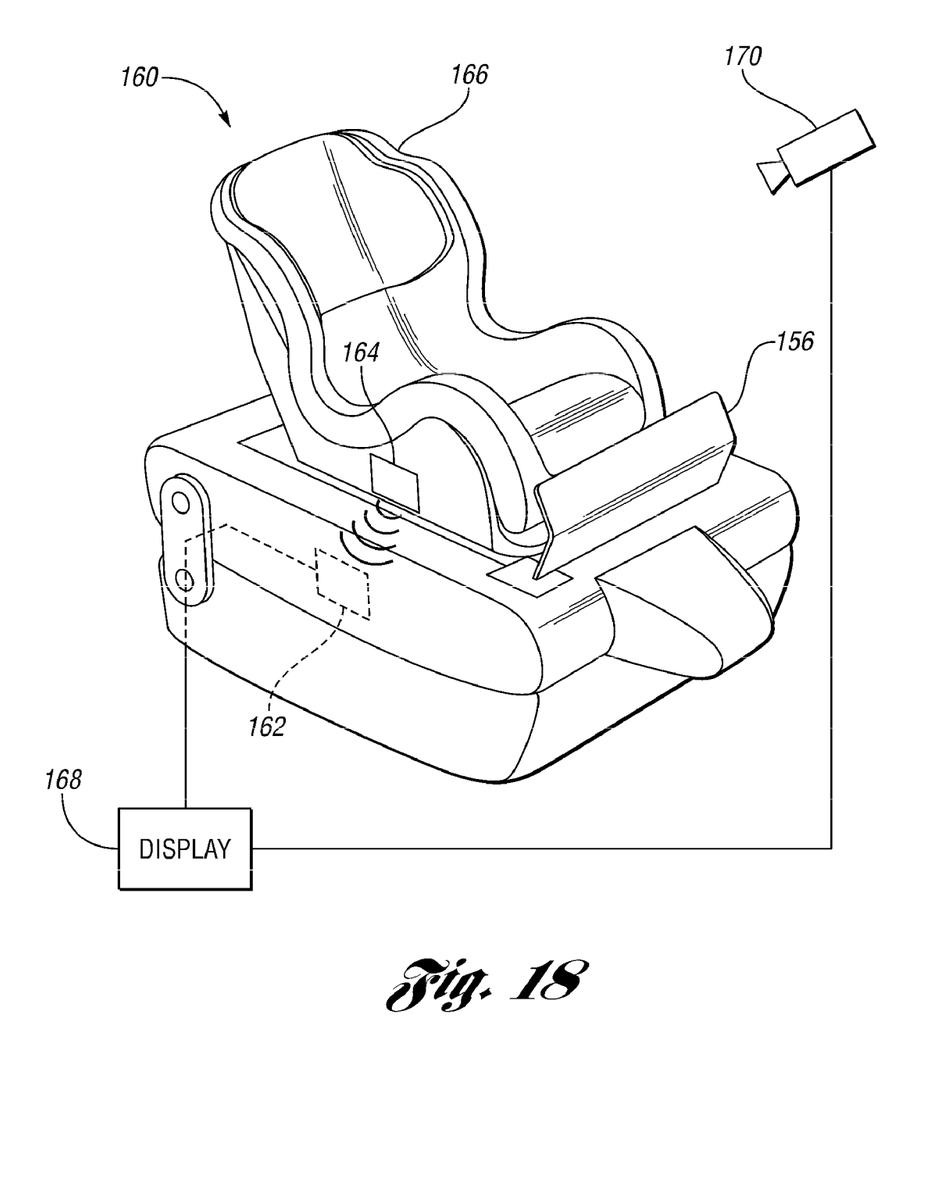
FIG. 18 is a schematic of the vehicle seat, child seat mounting assembly, child seat, and display in accordance with the present invention.

Referring now to FIG. 18, alternatively, a seat back 160 may include an antenna 162 for reading a radio frequency identification (RFID) tag 164 that is mounted on an associated child seat 166. The antenna 162 reads the RFID tag 164 to determine if the child seat 166 is properly installed and in the right location and orientation. This information may be determined by the antenna 162 identifying the location and orientation of the RFID tag 164. Alternatively, this information may be provided by sensors within the child seat 166 mounting hardware that inform the RFID tag 164 of the installation conditions. The antenna 162 is in communication with the display 168 in the front seating row of the vehicle for indicating to the driver the conditions of the seat back 160 being occupied by a child seat 166 and whether the child seat 166 is properly installed.

It is common for consumers to purchase aftermarket products that are not approved for installation within a vehicle for viewing the child. Such products include mirrors that are mounted rearward of a rearward facing child, for example, mirrors that are mounted upon a rear window of a vehicle. These products are not typically secured to the vehicle to withstand crash conditions and therefore are not approved by vehicle manufacturers for installation within the vehicle.

A vehicle camera 170 is installed within the vehicle and secured to the vehicle body for viewing the occupant of the child seat 166. The camera 170 is in communication with the display 168 for providing images of the occupant of the child seat 166 upon the display 168. The images may be a continuous motion picture or may be incremental captured images. The camera 170 can be any suitable camera, such as those known in the art for rear parking assistance. The camera 170 may have multiple mounting locations within the vehicle for accommodating multiple seating orientations, such as forward facing as illustrated in FIG. 18, rearward facing, multiple seats within the vehicle, and the like. The camera 170 may also have a rearward facing direction to face a rear window for rear parking assistance, when not employed for monitoring the occupant.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A vehicle seat comprising:
 a seat back adapted to be pivotally connected within a passenger compartment of a vehicle adjacent to a storage compartment for seating an occupant in an upright position of the seat back, and for providing access to the storage compartment in a collapsed position of the seat back, whereby a rear surface of the seat back faces upward; and
 a mounting plate adapted for receiving a child seat mounted thereto, the mounting plate being pivotally connected to the seat back such that the mounting plate is supported upon the rear surface of the seat back in the collapsed position of the seat back for positioning the child seat in a seating position for seating a child, and such that an angle between the mounting plate and the rear surface of the seat back diverges at a lower region of the seat back in the upright position of the at least one seat back for positioning the child seat within the storage compartment.

2. The vehicle seat of claim 1 wherein the mounting plate is retracted to and displaced along the rear surface of the seat back in the collapsed position of the seat back for positioning the child seat in a seating position for seating a child.

3. The vehicle seat of claim 1 wherein the mounting plate extends away from the seat back and into the storage compartment in the upright position of the seat back.

4. The vehicle seat of claim 1 wherein the mounting plate is adapted to be operably connected to the vehicle body to extend the mounting plate away from the seat back in the upright position and to retract the mounting plate in the collapsed position.

5. The vehicle seat of claim 1 wherein the mounting plate is pivotally connected to an upper region of the rear surface of the seat back about a generally transverse axis.

6. The vehicle seat of claim 5 further comprising a balance link adapted to be pivotally connected to a floor of the storage compartment, and pivotally connected to a lower region of the mounting plate to pivot the mounting plate away from the seat back in the upright position and to pivot the mounting plate to retract upon the rear surface of the seat back in the collapsed position.

7. The vehicle seat of claim 1 further comprising:
a base plate pivotally connected to the rear surface of the seat back wherein the mounting plate is rotatably connected to the base plate about an axis that is generally perpendicular to the mounting plate for rotating the child seat to a plurality of positions relative to the seat back and for positioning a high point of the child seat radially inward relative to a pivot axis of the seat back before extending the seat back to an upright position, thereby minimizing a radial range of travel of the child seat; and
a locking mechanism cooperating with the base plate and the mounting plate for locking mounting plate in a plurality of seating positions.

8. The vehicle seat of claim 1 further comprising:
a bracket adapted to be mounted to the rear surface of the seat back; and
a base plate pivotally connected to the bracket wherein the mounting plate is mounted to the base plate such that the pivotal connection of the bracket and the base plate further defines the pivotal connection of the mounting plate to the seat back.

9. The vehicle seat of claim 8 wherein the mounting plate is rotatably connected to the base plate about an axis that is generally perpendicular to the mounting plate for rotating the child seat to a plurality of positions relative to the seat back and for positioning a high point of the child seat radially inward relative to a pivot axis of the seat back before extending the seat back to an upright position, thereby minimizing a radial range of travel of the child seat.

10. The vehicle seat of claim 1 further comprising a plurality of hoops affixed to the mounting plate adapted to receive hooks of a child seat for mounting the child seat to the mounting plate.

11. The vehicle seat of claim 1 further comprising a locking mechanism adapted to cooperate with the vehicle body and the seat back for locking the seat back in the collapsed position.

12. The vehicle seat of claim 1 further comprising a reaction plate mounted to the mounting plate for supporting the child seat in a longitudinal direction.

13. The vehicle seat of claim 12 wherein the reaction plate is pivotally connected to the mounting plate for a stowed position and an extended position for supporting the child seat.

14. The vehicle seat of claim 1 wherein the seat back further comprises a frame;
wherein the vehicle seat further comprises a bracket fastened to the frame;
wherein the mounting plate is pivotally connected to the bracket.

* * * * *